R. V. JONES.
Sausage Cutter.
No. 21,965.
Patented Nov. 2, 1858.
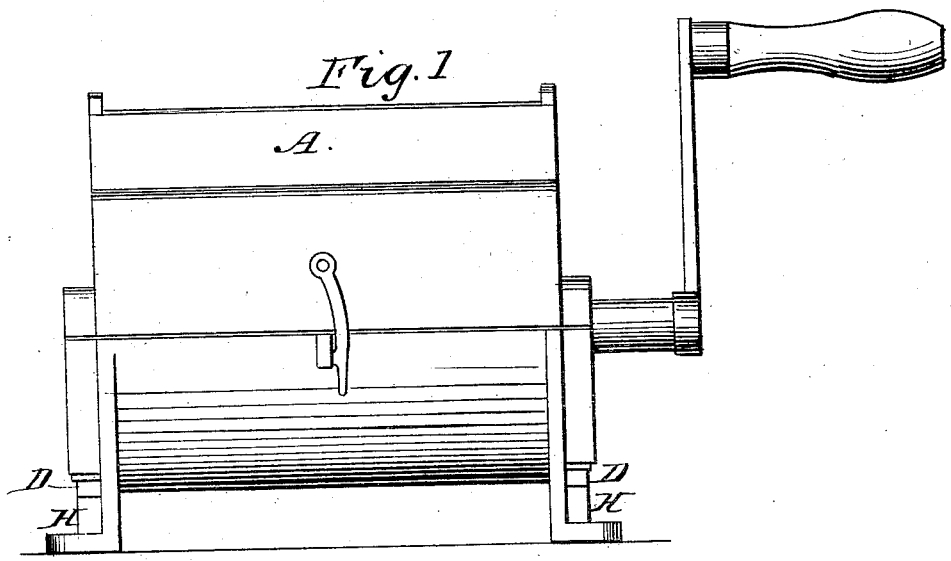
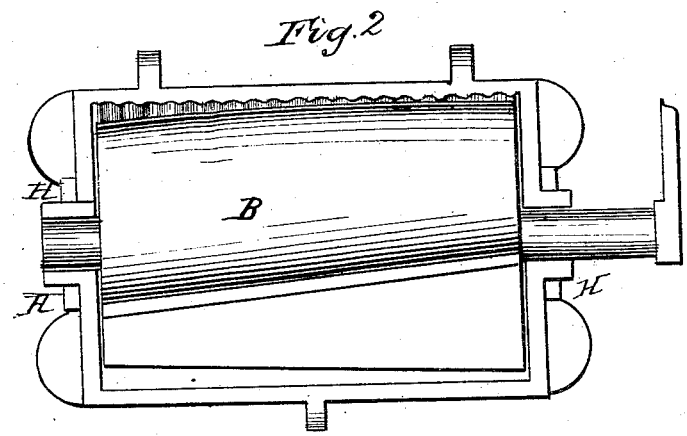
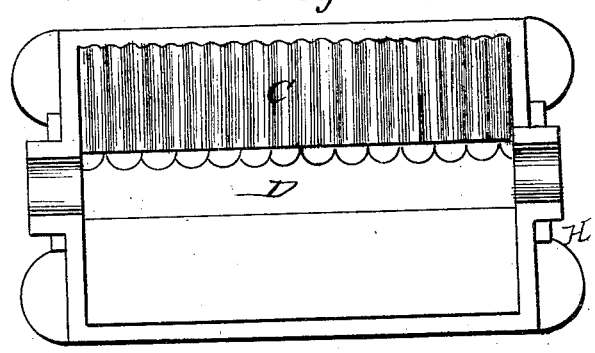

UNITED STATES PATENT OFFICE.

R. V. JONES, OF JOHNSTOWN, PENNSYLVANIA.

IMPROVED SAUSAGE-MACHINE.

Specification forming part of Letters Patent No. 21,965, dated November 2, 1858.

*To all whom it may concern:*

Be it known that I, R. V. JONES, of Johnstown, in the county of Cambria and State of Pennsylvania, have invented a new and Improved Sausage-Cutter; and I do hereby declare that the following is a full and exact description thereof, reference being had to the accompanying drawings, and to the letters of reference marked thereon, in which—

Figure 1 is a side elevation; Fig. 2, a top view with the lid removed, exhibiting the twisted flanged cylinder; and Fig. 3, a plan with the flanged cylinder removed, showing the ribs and knife.

To enable others skilled in the art to make and use my invention, I will proceed to describe its construction and operation.

Fig. 3 represents the lower semicircular concave cylinder, one half of which is ribbed, as represented by C, for the purpose of forming creases in the meat before operated upon by the knife D.

A, Fig. 1, is the hopper into which the meat is deposited, which is at once received by the flanged cylinder B, said flanges having a twisted form in order that as the cylinder revolves the meat may be pressed upon and cut or sheared off by the knife D. The knife D has a series of hooked or V-shaped teeth, as seen in Fig. 3, and is placed at the bottom of the concave cylinder and secured to its place by wedges H, or by means of set-screws, if desired.

Some of the advantages of my invention over all others are, first, that it is much less expensive, because of the great simplicity of its construction; secondly, that it can be cleansed with the utmost facility and kept in perfect order, and, thirdly, that the meat, as soon as cut, passing out from the cylinder is not, as in other machines, mangled by its repeated revolutions.

What I claim as my invention, and desire to secure by Letters Patent, is—

The arrangement of flanged cylinder B, with a knife D, having hooked or V-shaped teeth, substantially as and for the purpose specified.

R. V. JONES.

Attest:
   JOHNS HOLLINGSHEAD,
   PAUL STEVENS.